(12) United States Patent
Metzler et al.

(10) Patent No.: US 11,262,773 B2
(45) Date of Patent: Mar. 1, 2022

(54) METHOD FOR COMPENSATING LEAKAGE LOSSES AND CONVEYOR SYSTEM FOR CONVEYING A DEFINED VOLUME OF A LIQUID

(71) Applicant: Henkel AG & Co. KGaA, Düsseldorf (DE)

(72) Inventors: Mario Metzler, Lustenau (AT); Christian Schwabl, Bregenz (AT); Günter Baldauf, Hohenweiler (AT)

(73) Assignee: HENKEL AG & CO. KGAA, Düsseldorf (DE)

( * ) Notice: Subject to any disclaimer, the term of this patent is extended or adjusted under 35 U.S.C. 154(b) by 0 days.

(21) Appl. No.: 15/545,227

(22) PCT Filed: Mar. 2, 2016

(86) PCT No.: PCT/IB2016/051176
§ 371 (c)(1),
(2) Date: Jul. 20, 2017

(87) PCT Pub. No.: WO2016/142813
PCT Pub. Date: Sep. 15, 2016

(65) Prior Publication Data
US 2018/0011500 A1      Jan. 11, 2018

(30) Foreign Application Priority Data
Mar. 10, 2015   (DE) .......................... 102015103479.4

(51) Int. Cl.
*G05D 16/20* (2006.01)
*F04B 49/02* (2006.01)
(Continued)

(52) U.S. Cl.
CPC ......... *G05D 16/208* (2013.01); *F04B 49/022* (2013.01); *F04C 2/08* (2013.01);
(Continued)

(58) Field of Classification Search
CPC ....... G05D 16/208; F04C 2/08; B05C 5/0225; B05C 11/1036
See application file for complete search history.

(56) References Cited

U.S. PATENT DOCUMENTS 3,957,395 A * 5/1976 Ensign .................. F04B 49/022
                                                              417/12
4,089,170 A   5/1978 Johnson
(Continued)

FOREIGN PATENT DOCUMENTS

DE          3619147 A1 * 12/1987   ............ F04B 49/065
DE     102011121837 A1 *  6/2013   .............. F04B 49/06
(Continued)

OTHER PUBLICATIONS

International Search Report of PCT/IB2016/051176 dated Jun. 8, 2016, 2016.
(Continued)

*Primary Examiner* — Angelisa L. Hicks
(74) *Attorney, Agent, or Firm* — Rankin, Hill & Clark LLP

(57) ABSTRACT

A method and a device for compensating leakage losses in a line system, in which at least one positive displacement pump and at least one shut-off member are provided, wherein the method and device can be used for the isobaric metering of liquid plastic components and wherein the actual liquid pressure in the system is determined by way of a pressure measuring device and, when the shut-off member is closed is regulated to a pressure target value by actuation of the positive displacement pump, wherein the conveying loss rate of the positive displacement pump, which ensues to maintain the pressure target value when the shut-off member
(Continued)

is closed is added to a target delivery rate in order to compensate for the leakage loss occurring at the corresponding pressure target value.

12 Claims, 1 Drawing Sheet

(51) Int. Cl.
  *F04C 2/08* (2006.01)
  *B05C 5/02* (2006.01)
  *B05C 11/10* (2006.01)
  *F04C 14/28* (2006.01)

(52) U.S. Cl.
  CPC ......... *B05C 5/0225* (2013.01); *B05C 11/1036* (2013.01); *F04C 14/28* (2013.01)

(56) References Cited

U.S. PATENT DOCUMENTS

| | | | | |
|---|---|---|---|---|
| 4,708,596 A * | 11/1987 | Palm | ................ | F04B 49/08 417/218 |
| 5,464,328 A * | 11/1995 | Stoeger | ................ | B08B 3/026 417/12 |
| 6,167,702 B1 | 1/2001 | Schniederjan | | |
| 8,047,702 B1 * | 11/2011 | LoPresti | ............. | B01F 7/00641 366/153.1 |
| 2002/0182339 A1 * | 12/2002 | Taylor | ................ | C08F 283/10 427/510 |
| 2004/0167738 A1 * | 8/2004 | Miller | ................ | F04B 51/00 702/114 |
| 2011/0255994 A1 * | 10/2011 | Field | ................ | F04B 49/022 417/53 |
| 2013/0119152 A1 * | 5/2013 | Wishneski | ................ | B05B 1/04 239/128 |
| 2015/0014099 A1 | 1/2015 | Celik et al. | | |

FOREIGN PATENT DOCUMENTS

| | | |
|---|---|---|
| FR | 2484559 A1 | 12/1981 |
| GB | 2230876 A | 10/1990 |
| JP | 06-080883 U | 11/1994 |
| WO | 2012003870 A1 | 1/2012 |

OTHER PUBLICATIONS

Espacenet bibliographic data for FR Publication No. 2484559 published Dec. 18, 1981, 2 pages.
J-PlatPat bibliographic data for JP Publication No. 06-080883 published Nov. 15, 1994, 3 pages.

\* cited by examiner

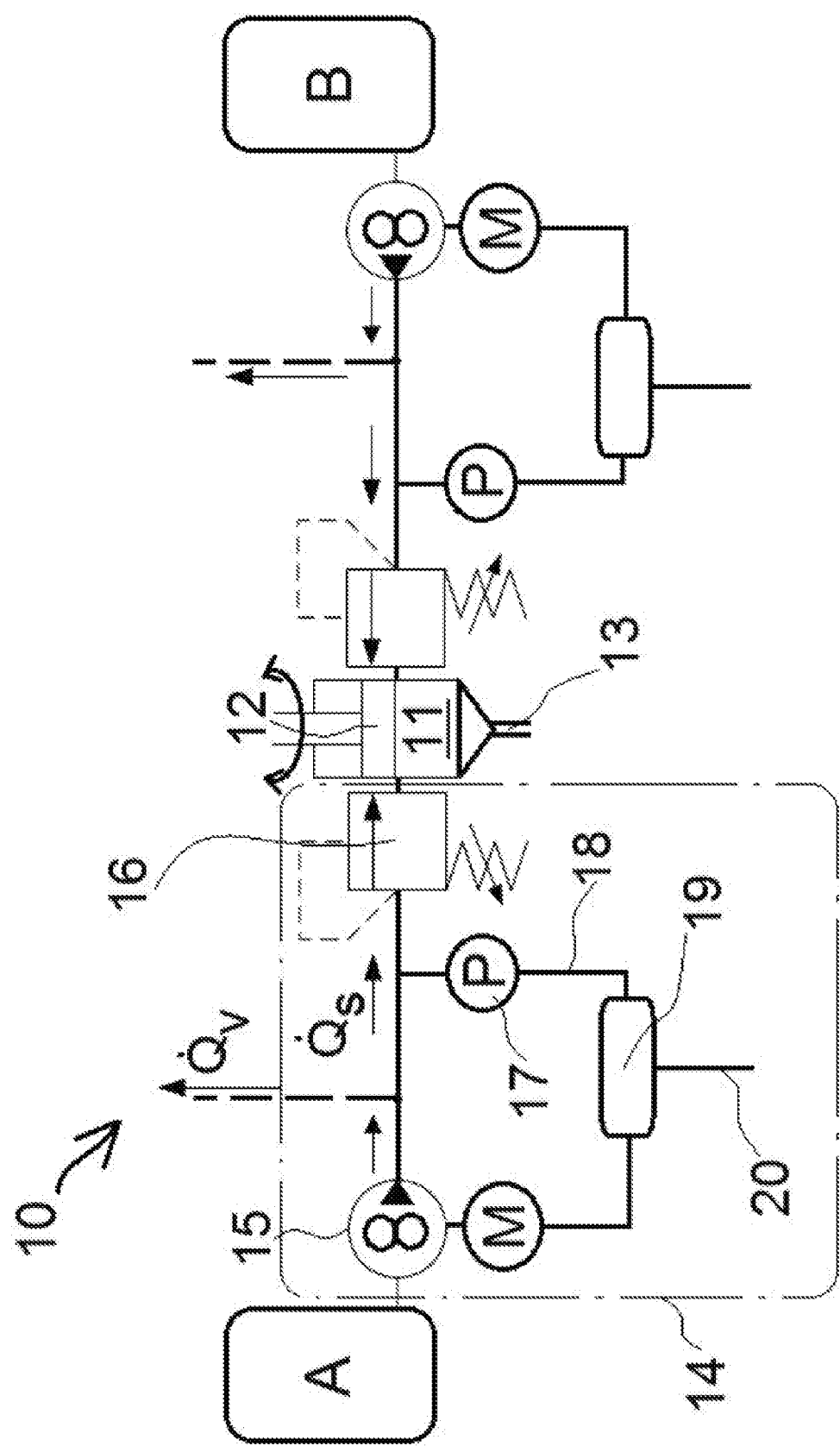

METHOD FOR COMPENSATING LEAKAGE LOSSES AND CONVEYOR SYSTEM FOR CONVEYING A DEFINED VOLUME OF A LIQUID

The invention relates to a method for compensating leakage losses in a line system for liquids having at least one positive displacement pump and at least one shut-off member, in particular in the isobaric metering of liquid plastic components. The invention also relates to a conveyor system for in particular isobaric conveying of a defined volume of a liquid per unit of time, in particular for metering of a liquid plastic component.

BACKGROUND OF THE INVENTION

During the processing of the components of two-component or multi-component plastic systems it is important that the components are mixed together as precisely as possible in a defined mixing ratio in order to be able to react completely. The mixing of the components takes place for example in a mixer head with a rotatably driven stirrer, wherein the two or more components are delivered to the mixer head via inlet valves and are mixed together in the interior of the mixer head, before the mixture is then discharged via a closable outlet of the mixer head, for example, in order to apply the mixture produced in this way to a structural part in a material strand which then, after the reaction of the mixture, forms an affixed seal on the structural part.

The components are conveyed by the conveyor system to the mixer head by means of positive displacement pumps, in particular geared pumps, through the line system, wherein in low pressure systems, that is to say systems in which the pressure of the components upon entry into the mixer head is only a little greater than the ambient pressure, the respective volumes conveyed can be readily handled by regulation of the rotational speed of the positive displacement pumps.

In systems in which the liquids to be conveyed are at higher pressures, however, leakage losses occur in particular in the region of the pumps because of the pressure gradient by comparison with the inlet of the pump, wherein these leakage losses can be increased or decreased not only with changing pressure conditions, but become greater with the increasing service life of the pump due to wear. The exact metering which is required during the processing of multi-component plastic systems is then difficult, since the material losses due to the leakages are quantitatively difficult to estimate. This applies in particular if between individual metering operations there are shutdown or waiting times of different durations, during which the shut-off member shuts off the line system, as the material losses are variable with the changing shutdown periods.

SUMMARY OF THE INVENTION

It is an object of the invention to provide a method and a conveyor system by which leakage losses during metering of the liquid can be taken into account in a particularly simple manner with great precision.

For this purpose according to the method according to certain aspects of the invention the actual liquid pressure in the line system is ascertained by means of a pressure measuring device and is brought to a pressure target value by actuation of the positive displacement pump with the shut-off member closed. In a particularly advantageous further embodiment of the invention it is then possible for the conveying loss rate of the positive displacement pump, which ensures to maintain the pressure target value when the shut-off member is closed, to be added to a target delivery rate in order to compensate for the leakage loss occurring at the relevant pressure target value. In order to carry out this method according to the invention, the conveyor system according to certain aspects of the invention has a line system with at least one positive displacement pump and at least one shut-off member, as well as a pressure measuring device which ascertains the actual liquid pressure in the line system and a control system which acts on the positive displacement pump as a function of the ascertained actual liquid pressure, including means for determining a conveying loss rate of the positive displacement pump with the shut-off member closed to maintain a target liquid pressure in the line system and preferably means for adding the conveying loss rate to a target delivery rate of the positive displacement pump with the shut-off member open.

The invention is based on the knowledge that, during the conveying of liquids such as for example liquid plastics or plastic components under constant pressure, the leakage losses occurring in the line system depend substantially (only) upon the pressure level in the system and the viscosity of the liquid and thus are at least largely independent of the currently conveyed volume flow. Thus they also occur in a pressurised line system when the shut-off member in the line system is closed, that is to say at times when no material is conveyed. In the operational state in which conveying of material does not take place, that is to say with the shut-off member closed, the extent of the leakage losses can be ascertained comparatively simply by regulating the pressure in the line system constantly to a target pressure. This target pressure may be in particular the conveying pressure which should prevail during a metering operation. The target pressure in the line system is obtained when the positive displacement pump is operated further at a correspondingly reduced conveying (loss) rate, so that the losses due to leakages are compensated. Through this measure it is ensured that, when the shut-off member is opened at the start of a new metering operation, the liquid is delivered immediately at the required pressure and thus also at the correct conveying rate to the subsequent assembly, for example a mixer head. In a particularly preferred further development of the method according to the invention, the resulting conveying loss rate, that is to say the material volume flow per unit of time which is conveyed in the system by the pump with the shut-off member closed and leaves the system as leakage loss at points which possibly cannot even be checked, can be added as a compensation variable to the target conveying rate with the shut-off member open, that is to say for example an open inlet valve on a mixer head, since it can be assumed that the leakage loss per unit of time also remains constant during the conveying of the material through the line system if the pressure in the system during the conveying operation does not change or does not change significantly with respect to the pressure in the system with the shut-off valve closed. Thus the values of actually occurring leakage losses to be ascertained in the stationary state of the system with the shut-off member closed can also be taken into account according to the invention during the conveying of material, whereby particularly precise conveying of a volume flow is possible.

According to certain other aspects of the invention a rotary displacement machine, in particular a geared pump, is preferably used as the positive displacement pump. The line system preferably has an at least largely constant volume at least between the positive displacement pump and the shut-off member.

The method according to certain aspects of the invention can be used advantageously in the conveying of thixotropic liquids, that is to say liquids of which the viscosity in the moving state (under shear stress) is lower than in the rest state. For example, some polyol components exhibit such a thixotropic material behaviour, as their viscosity falls significantly under shearing and—as a function of the length of the shutdown or waiting times—again increases clearly. In the case of different waiting times this possibly leads to different initial viscosities of the liquid at the start of a metering operation and thus to deviations at the start of metering.

In order to be able to compensate for this effect as a function of the length of the standstill time, in an advantageous further embodiment of the regulation according to the invention the pressure target value can be broken down into two parts. In this case the pressure target value consists of a basic pressure (for example the target pressure during a metering operation) plus a time-dependent offset. This offset can be designed as a conventional PT1 element used in regulating technology, whereby the increase in viscosity can be described very well as a function of the duration of the shutdown time between the metering operations.

If for example during the conveying of a thixotropic liquid under the influence of the shear effect a (target) pressure of 50 bars prevails in the flowing liquid, after a relatively long waiting time, during which the liquid does not flow and increases its viscosity, it is necessary to temporarily increase the initial pressure at the start of a new conveying or metering operation for compensation for the higher viscosity, for example to an (initial) pressure of 52 bars. If in fact the shut-off member were to open at a preload pressure of merely 50 bars, this would lead to a slight delay of the start of metering. In order to avoid this the target value of the shutdown pressure regulation is increased as a function of time to an increased initial target pressure, for example 52 bars. In this case the initial target pressure preferably approaches a maximum value logarithmically as the shutdown or waiting time increases.

These and other objects, aspects, features and advantages of the invention will become apparent to those skilled in the art upon a reading of the Detailed Description of the invention set forth below taken together with the drawing which will be described in the next section.

BRIEF DESCRIPTION OF THE DRAWING

The invention may take physical form in certain parts and arrangement of parts, a preferred embodiment of which will be described in detail and illustrated in the accompanying drawing which form a part hereof and wherein the single FIGURE shows a conveyor system according to the invention on a dynamic mixer head for mixing polyurethane or silicone plastic components for the production of a foaming sealing material in a flow diagram.

DESCRIPTION OF PREFERRED EMBODIMENTS

Referring now to the drawing wherein the showings are for the purpose of illustrating preferred and alternative embodiments of the invention only and not for the purpose of limiting the FIGURE shows a conveyor system 10 that serves for metering of two liquid plastic components A, B to a mixer head 11, in which the two components A, B are mixed together by means of a driven stirrer 12 in a precisely fixed quantitative ratio and are then discharged with an overpressure prevailing in the system by comparison with the ambient pressure as a reactive mixture via an outlet 13. Only as the mixture exits from the outlet is it subjected to the ambient pressure, i.e. the pressure in the interior of the mixer head is at least somewhat higher than ambient pressure. With such systems, for example, foaming seals are produced which are formed directly on a structural part.

A line system 14 of substantially the same construction is provided for each of the two components A, B. This system has a motor-driven geared pump 15 and a shut-off member 16 arranged on the mixer head 11 in the form of an electromagnetically switchable valve, by which the inlet for the respective component A, B into the interior of the mixer head can be opened or closed.

For starting of a metering operation the two valves 16 are opened, so that by means of the geared pumps 15 the components A, B are conveyed out of their respective storage containers in the required mixing ratio and into the mixer head 11, where they are mixed together by the stirrer 12, whilst maintaining the pressure prevailing in the line system 14, and are then discharged via the outlet 13 as a reactive plastic mixture.

In order to compensate for leakage losses which occur in the line system 14 due to unexpected leaks, for example in the region of the pump 15, and which are represented in the schematic drawing by the arrows on the broken lines as Qv, the line systems 14 are in each case provided with a pressure measuring device 17 which ascertains the system pressure in the line system 14 with the valve 16 closed. This actual liquid pressure 18 is compared with a pressure target value 20 in a comparator 19. As soon as a pressure drop is detected, and thus the actual liquid pressure drops relative to the pressure target value, the geared pump 15 is actuated, even with the valve 16 closed, at a correspondingly lower conveying (loss) rate, in order to deliver to the line system 14 precisely the quantity lost from the system due to the leakage Qv.

This conveying loss rate which is produced by the pump 15 with a few revolutions per unit of time is also taken into consideration during the process of conveying to the mixer head with the shut-off member open, i.e. in order to compensate for the leakage losses Qv the geared pump is operated at such a speed that it withdraws from the storage container for the component concerned a mass flow which corresponds to the sum of the leakage loss Qv ascertained with the valve closed and the target delivery rate Qs of the component concerned. In this way the leakage loss is also taken into account during the metering of the components to the mixer head.

While considerable emphasis has been placed on the preferred embodiment(s) of the invention illustrated and described herein, it will be appreciated that other embodiments, and equivalences thereof, can be made and that many changes can be made in the preferred embodiment(s) without departing from the principles of the invention. Furthermore, the embodiment(s) described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A method for compensating leakage losses in a line system; the line system for conveying a definitive volume of a liquid per unit of time for a subsequent use, the system having at least one positive displacement pump, a pressure measuring device and at least one shut-off member,
- wherein the method to compensate for the leakage loss in the line includes: wherein when the at least shut-off member is in a closed condition, such that the flow of the liquid is prevented from exiting the line system and passing through the at least one shut-off member, the pressure measuring device is operable to detect an actual liquid pressure in the line system,
- wherein when the pressure measuring device detects that the actual liquid pressure in the line system has dropped below a pressure target value, the at least one positive displacement pump is activated until the actual liquid pressure in the line system reaches the pressure target value,
- wherein the difference between the actual liquid pressure and the pressure target value is associated with a conveying loss rate volume of the liquid such that the conveying loss rate volume of the liquid is a defined volume of the liquid that is added into the line system by the at least one positive displacement pump to reach the pressure target value,
- wherein the at least one positive displacement pump is adjusted to add the conveying loss rate volume of the liquid to a target delivery rate for subsequent use per a unit of time;
- wherein the subsequent use is the next time the shut-off member is in the open condition.

2. The method according to claim 1, wherein the at least one positive displacement pump includes a rotary displacement machine.

3. The method according to claim 2, wherein the rotary displacement machine includes a geared pump.

4. The method according to claim 1, wherein the line system has a substantially constant volume at least between the at least one positive displacement pump and the at least one shut-off member.

5. The method according to claim 1, wherein in order to compensate for a thixotropic flow behaviour of the liquid the pressure target value with the at least one shut-off member closed is increased by comparison with the pressure target value during a conveying operation with the at least one shut-off member open.

6. The Method according to claim 5, wherein a regulation for raising and/or lowering the pressure target value takes place as a function of time in the manner of a PT1 element.

7. A conveyor system for conveying of a definitive volume of a liquid per unit of time for a subsequent use of the liquid, the conveyor system comprising a line system having at least one positive displacement pump, at least one shut-off member, a pressure measuring device and a control system, the at least one positive displacement pump operable to convey a definitive volume of a liquid per a unit of time for a subsequent use during normal operation when the at least one shut-off member is in an open condition, wherein flow of the liquid being prevented from exiting the line system and passing the at least one shut-off member for the subsequent use when the at least one shut-off member is in a closed condition,
- wherein when the at least shut-off member is in the closed condition wherein the flow of the liquid is prevented from exiting the line system and passing through the at least one shut-off member, the pressure measuring device is operable to detect an actual liquid pressure in the line system,
- wherein when the pressure measuring device detects that the actual liquid pressure in the line system has dropped below a pressure target value, the control system is operable to activate the at least one positive displacement pump until the actual liquid pressure in the line system reaches the pressure target value,
- wherein the difference between the actual liquid pressure and the pressure target value is associated with a conveying loss rate volume of the liquid such that the conveying loss rate volume of the liquid is a defined volume of the liquid that is added into the line system by the at least one positive displacement pump to reach the pressure target value,
- wherein the at least one positive displacement pump is adjusted to add the conveying loss rate volume of the liquid to a target delivery rate for subsequent use per a unit of time;
- wherein the subsequent use is the next time the shut-off member is in the open condition.

8. The conveyor system according to claim 7, wherein the at least one positive displacement pump includes a rotary displacement machine.

9. The conveyor system according to claim 8, wherein the rotary displacement machine includes a geared pump.

10. The conveyor system according to claim 7, wherein the line system has a substantially constant volume at least between the at least one positive displacement pump and the at least one shut-off member.

11. The conveyor system according to claim 7, wherein in order to compensate for a thixotropic flow behaviour of the liquid the pressure target value with the at least one shut-off member closed is increased by comparison with the pressure target value during a conveying operation with the at least one shut-off member open.

12. The conveyor system according to claim 11, wherein a regulation for raising and/or lowering the pressure target value takes place as a function of time in the manner of a PT1 element.

* * * * *